United States Patent
Sun et al.

(10) Patent No.: US 9,771,851 B2
(45) Date of Patent: Sep. 26, 2017

(54) METHOD AND APPARATUS FOR CONTROLLING AN INTERNAL COMBUSTION ENGINE COUPLED TO AN EXHAUST AFTERTREATMENT SYSTEM

(71) Applicant: GM GLOBAL TECHNOLOGY OPERATIONS LLC, Detroit, MI (US)

(72) Inventors: Min Sun, Troy, MI (US); Shifang Li, Shelby Township, MI (US); Giuseppe Mazzara Bologna, Nicosia (IT); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/041,687

(22) Filed: Feb. 11, 2016

(65) Prior Publication Data
US 2017/0234199 A1    Aug. 17, 2017

(51) Int. Cl.
| F01N 3/00 | (2006.01) |
| F01N 9/00 | (2006.01) |
| F01N 3/023 | (2006.01) |
| F01N 3/20 | (2006.01) |

(52) U.S. Cl.
CPC ............ *F01N 9/005* (2013.01); *F01N 3/023* (2013.01); *F01N 3/208* (2013.01); *F01N 9/002* (2013.01)

(58) Field of Classification Search
USPC .................. 60/274, 286, 295, 297, 301, 303
See application file for complete search history.

(56) References Cited

U.S. PATENT DOCUMENTS

| 8,333,062 | B2 | 12/2012 | Sun |
| 8,516,798 | B2 * | 8/2013 | Dobson .................. F01N 3/035 60/286 |
| 8,855,894 | B2 | 10/2014 | Hamama et al. |
| 9,394,820 | B2 * | 7/2016 | Osumi ............... B01D 53/9418 |
| 2009/0107118 | A1 * | 4/2009 | Ruona .................. F01N 13/009 60/286 |
| 2012/0233986 | A1 * | 9/2012 | Geveci .................... F01N 3/208 60/274 |
| 2012/0255285 | A1 * | 10/2012 | Gonze ................. F01N 13/0093 60/286 |
| 2015/0275730 | A1 * | 10/2015 | Gupta .................... F01N 3/208 60/274 |

* cited by examiner

*Primary Examiner* — Binh Q Tran
(74) *Attorney, Agent, or Firm* — Quinn IP Law

(57) ABSTRACT

An internal combustion engine fluidly coupled to an exhaust aftertreatment system includes a particulate filter device, a first selective catalytic reduction device disposed upstream relative to a second selective catalytic reduction device, and an injection system disposed to inject a reductant into the exhaust gas feedstream upstream relative to the first selective catalytic reduction device. A method for controlling the internal combustion engine includes monitoring engine operation, and determining an amount of particulate matter stored on the particulate filter based thereon. An amount of reductant stored on the second selective catalytic reduction device and operating conditions associated with the exhaust aftertreatment system are also determined. A process to regenerate the particulate filter is executed only when the amount of reductant stored on the second selective catalytic reduction device is greater than a minimum threshold and the operating conditions are conducive to regenerating of the particulate filter.

11 Claims, 2 Drawing Sheets

METHOD AND APPARATUS FOR CONTROLLING AN INTERNAL COMBUSTION ENGINE COUPLED TO AN EXHAUST AFTERTREATMENT SYSTEM

TECHNICAL FIELD

This disclosure relates to internal combustion engines that are fluidly coupled to exhaust aftertreatment systems, and methods for their control.

BACKGROUND

Internal combustion engines fluidly couple to exhaust aftertreatment systems that purify exhaust gases generated as byproducts of combustion. Byproducts of combustion may include unburned hydrocarbons, carbon monoxide, nitrides of oxide, often referred to as NOx molecules, and particulate matter. Particulate matter may be generated in an internal combustion engine operating in a compression-ignition state. Exhaust aftertreatment systems may include oxidation catalysts, reduction catalysts, selective catalytic reduction catalysts and particulate filters.

Selective catalytic reduction catalysts may employ reductants for reducing NOx molecules to elemental nitrogen. The reductants may be stored on a surface or otherwise captured in selective catalytic reduction catalysts. Particulate filters capture particulate matter, and may require periodic regeneration. The process of regenerating a particulate filter may affect an amount of reductant that is stored on a selective catalytic reduction catalyst that is downstream of a particulate filter.

SUMMARY

An internal combustion engine fluidly coupled to an exhaust aftertreatment system is described. The exhaust aftertreatment system includes a particulate filter device, a first selective catalytic reduction device disposed upstream relative to a second selective catalytic reduction device, and an injection system disposed to inject a reductant into the exhaust gas feedstream upstream relative to the first selective catalytic reduction device. A method for controlling the internal combustion engine includes monitoring engine operation, and determining an amount of particulate matter stored on the particulate filter based upon the engine operation. An amount of reductant stored on the second selective catalytic reduction device and operating conditions associated with the exhaust aftertreatment system are also determined. A process to regenerate the particulate filter is executed only when the amount of reductant stored on the second selective catalytic reduction device is greater than a minimum threshold and the operating conditions are conducive to regenerating of the particulate filter.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
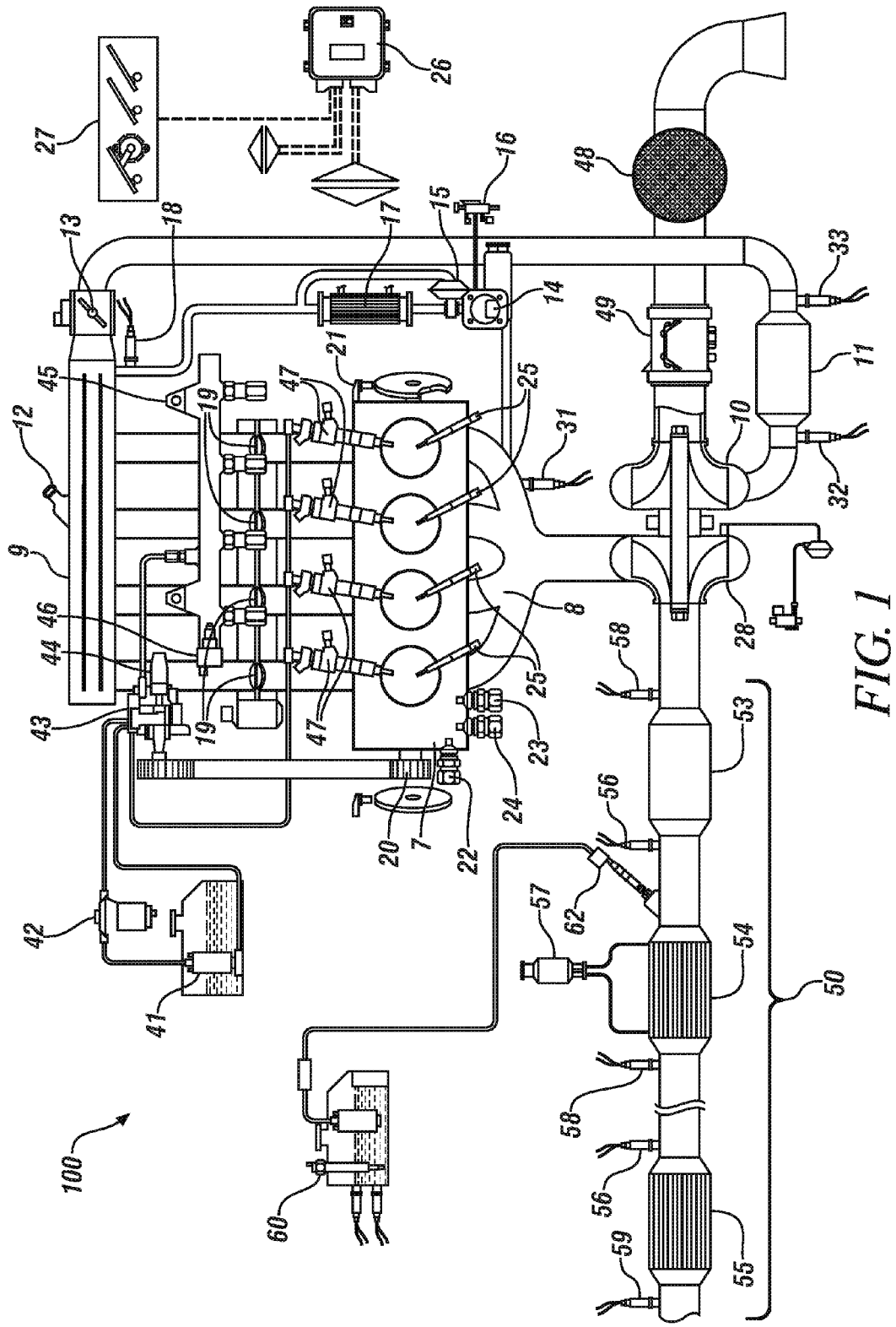
FIG. 1 schematically illustrates an internal combustion engine fluidly coupled to an exhaust gas aftertreatment system including first and second selective catalytic reduction devices (SCRs) and a particulate filter, in accordance with the disclosure.

Referring now to the drawings, wherein the depictions are for the purpose of illustrating certain exemplary embodiments only and not for the purpose of limiting the same, FIG. 1 schematically illustrates an internal combustion engine (engine) 100 that is fluidly coupled to an exhaust aftertreatment system 50 that is arranged in accordance with an embodiment of this disclosure. The engine 100 is a multi-cylinder internal combustion engine that combusts a mixture of directly-injected fuel, intake air and recirculated exhaust gas to generate mechanical power. The engine 100 is configured as a compression-ignition engine as shown, although the concepts described herein may be employed on other engine configurations that employ embodiments of the exhaust aftertreatment system 50 described herein. The engine 100 may be employed on a ground vehicle, e.g., a passenger car, truck, agricultural vehicle or a construction vehicle, on a marine vehicle, or in a stationary setting, e.g., coupled to an electric power generator. As employed herein, the term "upstream" and related terms refer to elements that are towards an origination of a flow stream relative to an indicated location, and the term "downstream" and related terms refer to elements that away from an origination of a flow stream relative to an indicated location.

The engine 100 preferably includes a multi-cylinder engine block 7, an intake manifold 8 for channeling intake air to the cylinders of the engine 100, and an exhaust manifold 9 for entraining exhaust gas for channeling through the exhaust aftertreatment system 50. Other unillustrated engine components and systems include pistons, crankshaft, engine head(s), intake valves, exhaust valves, camshaft(s), and variable cam phasers when employed. The engine 100 preferably operates in a four-stroke combustion cycle of repetitively-executed strokes of intake-compression-combustion-exhaust. A variable geometry turbocharger (VGT) includes a turbine 28 that fluidly couples to the exhaust manifold 9 upstream relative to the exhaust aftertreatment system 50 in one embodiment. The engine 100 includes a plurality of direct-injection fuel injectors 47 that are arranged to directly inject fuel into individual combustion chambers. The injectors 47 may be any suitable direct-injection device, such as solenoid-activated devices in one embodiment. Fuel is supplied to the injectors 47 from a fuel storage tank via a low-pressure fuel pump 41, a fuel filter assembly 42, a high-pressure fuel pump 43, a fuel metering valve 44, a fuel rail 45 and a pressure regulating valve 46. Each of the engine cylinders preferably includes a glow plug 25. The engine 100 also includes an intake air system, which may include an intake air filter 48, a mass air flow sensor 49, a compressor 10 of the VGT, a charge air cooler 11, a throttle valve 13, a sensor 12 for monitoring boost pressure and intake air temperature, and other sensing devices as may be useful. The engine 100 may include an exhaust gas recirculation (EGR) system that fluidly channels exhaust gas from the exhaust manifold 9 to the intake manifold 8. In one embodiment, the EGR system may include an EGR valve 14, an EGR cooler 17 including a bypass valve 15, an EGR outlet temperature sensor 18, an EGR cooler inlet temperature sensor 31 and a vacuum switch 16. The intake manifold 8 may also include a plurality of swirl valves 19 for mixing intake air and the recirculated exhaust gas. Other engine monitoring sensors may include a crankshaft position sensor 20, a camshaft position sensor 21, a coolant temperature sensor 22, an oil level switch 23 and an oil pressure switch 24, among others. One or more engine monitoring sensors may be replaced with a suitable executable model.

An engine controller 26 monitors various sensing devices and executes control routines to command various actuators to control operation of the engine 100 in response to operator commands. Operator commands may be determined from various operator input devices, including, e.g., a pedal assembly 27 that includes, by way of example, an accelerator pedal and a brake pedal. Other sensing devices associated with engine operation may include, by way of non-limiting example only, a barometric pressure sensor (not shown), an ambient air temperature sensor (not shown), a VGT position sensor (not shown), the exhaust gas temperature sensor 31, an air charge inlet temperature sensor 32 and an air charge outlet temperature sensor 33, among others.

The exhaust aftertreatment system 50 includes a plurality of fluidly connected exhaust purifying devices for purifying engine exhaust gas prior to expulsion to ambient air. An exhaust purifying device may be any device that is configured to oxidize, reduce, filter and/or otherwise treat constituents of the exhaust gas feedstream, including but not limited to hydrocarbons, carbon monoxide, nitrides of oxygen (NOx), and particulate matter. In the embodiment shown, first, second and third exhaust purifying devices 53, 54 and 55, respectively, are deployed. The first and second exhaust purifying devices 53, 54 are closely coupled to the exhaust manifold 9 and preferably located within an engine compartment. The third exhaust purifying device 55 may be distally located, such as in an underfloor location when employed on a ground vehicle. The first exhaust purifying device 53 may be an oxidation catalyst for oxidizing hydrocarbons and other constituents in the exhaust gas feedstream in certain embodiments, and is referred to hereafter as an oxidation catalyst 53. The second exhaust purifying device 54 may be a particulate filter co-arranged with a first selective catalyst reduction catalyst, and is referred to hereafter as a DPF/SCR 54. A reductant delivery system 60 including an injection nozzle 62 may be positioned upstream relative thereto to controllably supply reductant into the exhaust gas feedstream to facilitate NOx reduction. The third exhaust purifying device 55 may be a second selective catalyst reduction catalyst, and is referred to hereafter as a second SCR 55. In one embodiment, the first and second SCRs may be urea-based devices, and the injected reductant may be urea. As appreciated by those skilled in the art, urea may convert to ammonia (NH3), which may be stored on the substrates of either or both the DPF/SCR 54 and the second SCR 55, and may react with and reduce NOx molecules to form elemental nitrogen (N2) and other inert gases.

Each of the oxidation catalyst 53, DPF/SCR 54 and second SCR 55 includes a ceramic or metallic substrate having flow channels that have been coated with suitable materials including, by way of non-limiting examples: platinum-group metals such as platinum, palladium and/or rhodium; other metals, such as copper; cerium; and other materials. The coated materials effect chemical reactions to oxidize, reduce, filter or otherwise treat constituents of the exhaust gas feedstream under certain conditions related to temperature, flowrate, air/fuel ratio and others. The embodiment shown includes the elements of the exhaust aftertreatment system 50 in one arrangement, which is illustrative. In an alternative embodiment, the particulate filter and the oxidation catalyst may be collocated on a single substrate as part of the oxidation catalyst 53 and collocated within a single mechanical assembly. Other arrangements of the elements of the exhaust aftertreatment system 50 may be employed within the scope of this disclosure, with such arrangements including addition of other exhaust purifying devices and/or omission of one or more of the exhaust purifying devices, depending upon requirements of the specific application.

Sensors for monitoring the exhaust purifying devices of the exhaust aftertreatment system 50 may include one or multiple exhaust gas sensors 58, one or multiple particulate matter sensors 56, and a delta pressure sensor 57 for monitoring pressure drop across the DPF/SCR 54, one or multiple temperature sensors 59, and/or other suitable sensing devices and models for monitoring the exhaust gas feedstream. The exhaust gas sensor 58 may be a NOx sensor, a wide-range lambda sensor, or another suitable exhaust gas sensing device. Such sensors and models may be arranged to monitor or otherwise determine parameters associated with performance of individual ones of the exhaust purifying devices, monitor parameters associated with performance of a subset of the exhaust purifying devices, or monitor parameters associated with performance of the overall exhaust aftertreatment system 50. The exhaust gas sensor 58 is preferably arranged to monitor the exhaust gas feedstream upstream relative to the oxidation catalyst 53. Alternatively, or in addition, the exhaust gas sensor 58 may be arranged to monitor the exhaust gas feedstream downstream of the oxidation catalyst 53. The exhaust gas sensor 58 may be fabricated as a planar-type zirconium oxide dual cell device having a sensing element and an integrated electrically-powered heating element.

Engine control includes controlling various engine operating parameters, including controlling preferred engine control states to minimize various exhaust gas constituents through chemical reaction processes that include, by way of non-limiting examples, oxidation, reduction, filtering, and selective reduction. Other engine control states include controlling operating parameters to warm-up the engine 100 and transfer heat or otherwise warm up various ones of the oxidation catalyst 53, DPF/SCR 54 and second SCR 55 so as to effect efficacious operation thereof.

In one embodiment, a process for effecting rapid warm-up of the second SCR 55 may include passing unburned hydrocarbons into the exhaust gas feedstream to flow to the oxidation catalyst 53 to oxidize therein to increase temperature of the exhaust gas feedstream as it enters the second SCR 55. One engine control process that may cause unburned hydrocarbons to pass into the exhaust gas feedstream includes post-combustion fuel injection events. A post-combustion fuel injection event is any fuel injection event during a portion of the combustion cycle when fuel is injected into a combustion chamber after a combustion event, resulting in unburned fuel in the combustion chamber that may pass into the exhaust gas feedstream to the exhaust aftertreatment system 50. This may include injecting fuel late in each combustion stroke or during an exhaust stroke by activating the fuel injectors 47.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and that may include monitoring or otherwise determining states of parameters and updating the states of the parameters during execution of a routine or between iterations of execution of the routine.

The engine controller 26 includes executable code to preload the second SCR 55 to have a desired amount of ammonia storage prior to executing a routine to regenerate the particulate filter of the DPF/SCR 54, thus facilitating NOx reduction in the second SCR 55 during regeneration. This mitigates an inability to control the ammonia loading on the second SCR 55 during regeneration of the DPF/SCR 54 because of likelihood that reductant material that is injected by the reductant delivery system 60 may be oxidized in the DPF/SCR 54. Such operation is described with reference to FIGS. 2 and 3.

Figure 2:
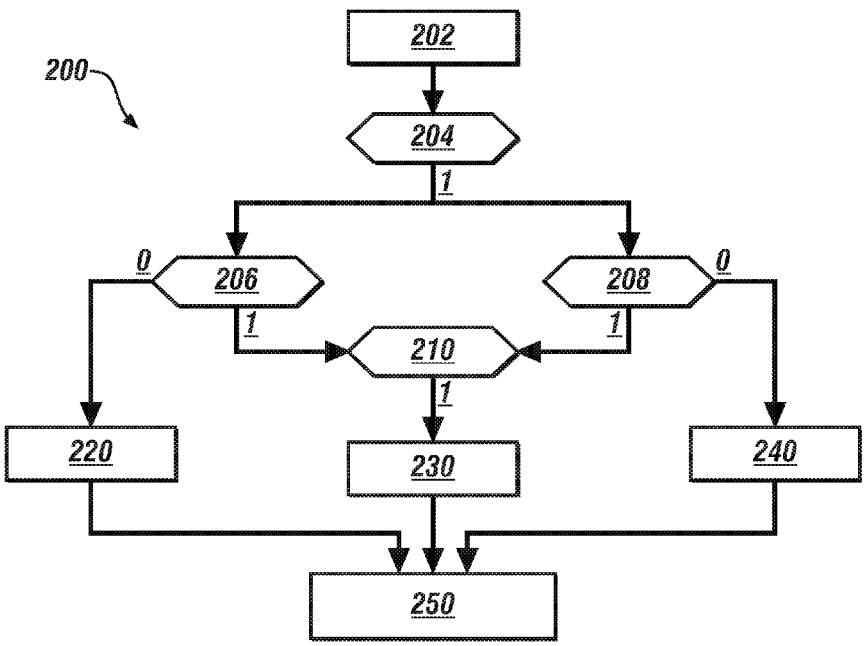
FIG. 2 schematically shows a particulate filter regeneration control routine that may be employed to control an embodiment of the internal combustion engine and exhaust aftertreatment system described with reference to FIG. 1, in accordance with the disclosure.

FIG. 2 schematically shows a particulate filter regeneration control routine 200 that may be employed to control an internal combustion engine that includes an exhaust aftertreatment system having first and second SCRs and a particulate filter. One embodiment of an internal combustion engine 100 and an exhaust aftertreatment system 50 having first and second SCRs and a particulate filter is described with reference to FIG. 1. Overall, the particulate filter regeneration control routine 200 includes monitoring engine operation to determine an amount of particulates stored on the particulate filter and determining an amount of reductant stored on the second selective catalytic reduction device. Operating conditions of the second selective catalytic reduction device are also determined. A process to regenerate the particulate filter is executed only when the amount of reductant stored on the second selective catalytic reduction device is greater than a minimum threshold and the operating conditions are conducive to regenerating the particulate filter. The particulate filter regeneration control routine 200 is preferably periodically executed by the engine controller 26 as one or more instruction sets and accompanying calibrations during engine operation. Table 1 is provided as a key wherein the numerically labeled blocks and the corresponding functions are set forth as follows, corresponding to the particulate filter regeneration control routine 200.

TABLE 1

| BLOCK | BLOCK CONTENTS |
|---|---|
| 202 | Monitor engine operation and exhaust gas feedstream |
| 204 | Is there a request to regenerate the particulate filter? |
| 206 | Are entry conditions for regeneration met? |
| 208 | Is amount of ammonia storage on the second SCR greater than minimum threshold ammonia storage |
| 210 | Permit particulate filter regeneration? |
| 220 | Execute engine control to prepare for particulate filter regeneration |
| 230 | Execute particulate filter regeneration |
| 240 | Prepare SCR for particulate filter regeneration |
| 250 | End iteration |

The particulate filter regeneration control routine (PF Regen Routine) 200 preferably periodically executes during engine operation. This includes regular, periodic monitoring operation of the engine and the exhaust gas feedstream employing sensors and/or controller-executable models (202). Such monitoring includes determining particulate matter loading on the particulate filter, which may be accomplished by monitoring pressure drop across the particulate filter and estimating the particulate matter loading based upon the pressure drop employing a correlation, or by estimating the particulate matter loading based upon accumulated engine speed, load and temperature parameters, or employing another suitable monitoring scheme. Methods and routines to estimate particulate matter that is generated from operation of an internal combustion engine are known to those skilled in the art. When there is an indication that the particulate matter loading on the particulate filter is approaching a threshold level, the PF Regen Routine 200 generates a request to regenerate the particulate filter (204) (1).

The PF Regen Routine 200 evaluates entry conditions for particulate filter regeneration (206) simultaneously with evaluating the amount of ammonia stored on the second SCR (208).

Evaluating the entry conditions for particulate filter regeneration (206) preferably includes monitoring exhaust gas temperature. When the entry conditions for regenerating the particulate filter regeneration are not satisfied (206)(0), engine operation is controlled to prepare for regeneration (220), and this iteration ends (250).

Controlling operation of the engine to prepare for particulate filter regeneration preferably includes adjusting fuel injection timing (220). Evaluating the amount of ammonia stored on the second SCR (208) preferably includes calculating an amount of ammonia storage in the second SCR.

When the ammonia storage on the second SCR is less than a minimum threshold ammonia storage amount (208)(0), the operation of the engine is controlled to increase the ammonia storage on the second SCR (240), and this iteration ends (250). One embodiment of an ammonia dosing rate control routine 300 to increase the ammonia storage on the second SCR is described with reference to FIG. 3.

When the operation of the engine is prepared for regeneration (206)(1) and the ammonia storage on the second SCR is greater than the minimum threshold ammonia storage amount (208)(1), the PF Regen Routine 200 executes processes to regenerate the particulate filter (230), and this iteration of the routine ends (250). Processes to regenerate a particulate filter may include increasing the temperature of the exhaust gas feedstream to a temperature that is sufficient to oxidize the stored particulate matter, and are known to those skilled in the art.

Figure 3:
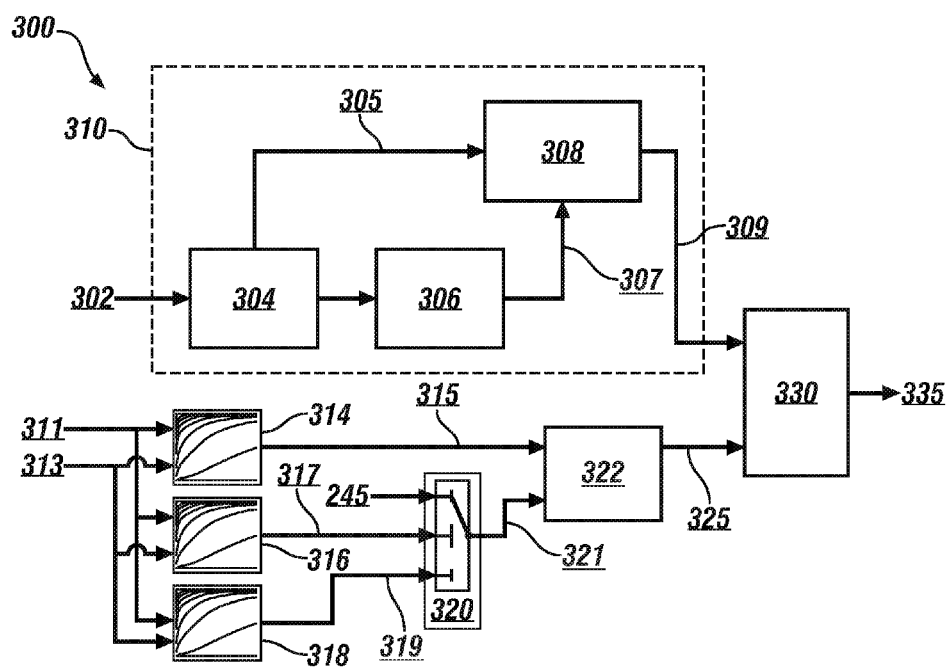
FIG. 3 schematically shows an embodiment of the ammonia dosing rate control routine that may be employed to control an embodiment of the internal combustion engine and exhaust aftertreatment system described with reference to FIG. 1, wherein the ammonia dosing rate control routine controls the amount of ammonia that is stored on the second SCR, in accordance with the disclosure.

FIG. 3 schematically shows an embodiment of the ammonia dosing rate control routine 300 that is referenced in FIG. 2, which may be employed to control an internal combustion engine that includes an exhaust aftertreatment system having first and second SCRs and a particulate filter, wherein the control is executed to increase or otherwise manage the amount of ammonia that is stored on the second SCR, i.e., step 240 of FIG. 2. In certain embodiments, the first SCR corresponds to the DPF/SCR 54 that is described with reference to FIG. 1 and the second SCR corresponds to the second SCR 55 that is described with reference to FIG. 1.

Inputs to the ammonia dosing rate control routine 300 preferably include a plurality of sensed or estimated engine and exhaust system operating parameters 302. The engine and exhaust system operating parameters 302 preferably include an ammonia dosing rate, an exhaust flowrate, and an air/fuel ratio, which may be monitored directly or inferred based upon monitored states of the engine. Other parameters include exhaust gas temperature 311 and space velocity 313 for each of the first and second SCRs, wherein the space velocity 313 is determined based upon volumes (ml) of the first and second SCRs and a volumetric flowrate (l/s) of the exhaust gas. Those skilled in the art are able to determine space velocity for exhaust aftertreatment devices such as the first and second SCRs that are described with reference to FIG. 1.

The ammonia dosing rate control routine 300 includes a model portion 310 to determine an effective amount of ammonia that is stored on the first and second SCRs 309 based upon the sensed or estimated engine and exhaust system operating parameters 302. The model portion includes a first model 304, which is a one-dimensional kinetic model of the first SCR, and a second model 306, which is a one-dimensional kinetic model of the second SCR. One-dimensional kinetic models of SCRs are known to those skilled in the art. The first model 304 generates an output 305 that includes measures of ammonia and NOx molecules that are stored on the first SCR based upon the sensed or estimated engine and exhaust system operating parameters 302. The output 305 generated by the first model 304 preferably also indicates breakthrough of ammonia and NOx molecules out of the first SCR. The second model 306 generates an output 307 that includes measures of ammonia and NOx molecules that are stored on the second SCR 55, based upon the output from the DPF/SCR 54, which is input thereto. The second model 306 may also indicate breakthrough of ammonia and NOx molecules out of the second SCR.

The ammonia storage on the first SCR that is the output 305 from the first model 304 and the ammonia storage on the second SCR that is the output 307 from the second model 306 are supplied to a summing element 308, which determines an effective ammonia storage for the first and second SCRs 309 based thereon. The effective ammonia storage for the first and second SCRs 309 is determined as follows:

$$NH3_{EFF} = NH3_{SCR1} + f_{table}(T_{SCR2}) \cdot NH3_{SCR2} \qquad [1]$$

wherein:
$NH3_{EFF}$ is the effective ammonia storage for the first and second SCRs;
$NH3_{SCR1}$ is the ammonia storage for the first SCR;
$T_{SCR2}$ is a temperature of the second SCR;
$f_{table}(T_{SCR2})$ is a parameter based upon $T_{SCR2}$; and
$NH3_{SCR2}$ is the ammonia storage for the second SCR;

The exhaust gas temperature 311 and space velocity 313 for each of the first and second SCRs are applied to a first model 314 to determine a first ammonia storage setpoint 315 that is associated with the first SCR. The first ammonia storage setpoint 315 that is associated with the first SCR preferably indicates a maximum ammonia storage capacity for the first SCR based upon its temperature and space velocity. Additional amounts of ammonia in the exhaust gas feedstream may lead to breakthrough of ammonia, some of which would pass to the second SCR.

The exhaust gas temperature 311 and space velocity 313 for each of the first and second SCRs are applied to a second model 316 to determine a second ammonia storage setpoint 317 that is associated with the second SCR. The second ammonia storage setpoint 317 that is associated with the second SCR preferably indicates an ammonia storage capacity for the second SCR, based upon its temperature and space velocity, which may be necessary for effective operation of the exhaust aftertreatment system to reduce NOx generated by operation of the engine. The second ammonia storage setpoint 317 is determined based upon the parameters associated with the exhaust gas temperature 311 and the space velocities 313 for the first and second selective catalytic reduction devices when not preparing to execute the process to regenerate the particulate filter.

The exhaust gas temperature 311 and space velocity 313 for each of the first and second SCRs are applied to a third model 318 to determine a third ammonia storage setpoint 319 that is associated with the second SCR when preparing to operate the engine to regenerate the particulate filter. The third ammonia storage setpoint 319 that is associated with the second SCR preferably indicates a maximum ammonia storage capacity for the second SCR based upon its temperature and space velocity. Additional amounts of ammonia may lead to breakthrough of ammonia, referred to as ammonia slip. States of temperatures, space velocities, and other operating parameters are application-specific and may be determined employing known engineering practices during product development, or may otherwise be determined.

As indicated at element 320, the regeneration trigger 245 is employed to select the second ammonia storage setpoint 317 as a preferred ammonia storage point 321, unless the engine is operating to regenerate the particulate filter. When the engine is operating to regenerate the particulate filter, the regeneration trigger 245 selects the third ammonia storage setpoint 319 as the preferred ammonia storage point 321. Referring again to FIG. 2, the regeneration trigger 245 indicating that the engine is operating to regenerate the particulate filter is provided by the PF Regen Routine 200 as part of step 240, which includes controlling operation of the engine to increase the ammonia storage on the second SCR.

The first ammonia storage setpoint 315 that is associated with the first SCR and the preferred ammonia storage setpoint 321 associated with the second SCR are combined (322) to determine a total effective ammonia storage setpoint 325.

The total effective ammonia storage setpoint 325 is compared with the effective ammonia storage for the first and second SCRs 309 (330) and a preferred reductant dosing rate 335 is selected to control the dosing device based thereon. This preferably includes increasing the reductant dosing rate 335 when the effective ammonia storage for the first and second SCRs 309 is less than the total effective ammonia storage setpoint 325, and decreasing the reductant dosing rate 335 when the effective ammonia storage for the first and second SCRs 309 is greater than the total effective ammonia storage setpoint 325. This includes selecting a magnitude of the reductant dosing rate 335 based upon a difference between the effective ammonia storage for the first and second SCRs 309 and the total effective ammonia storage setpoint 325.

Referring again to FIG. 1 and with continued reference to FIG. 3, the engine controller 26 generates control signals to control the reductant delivery system 60 to deliver reductant into the exhaust gas feedstream based upon the reductant dosing rate 335. As such, the engine controller 26 preloads the second SCR 55 to have a desired amount of ammonia storage prior to executing a routine to regenerate the particulate filter of the DPF/SCR 54, thus facilitating NOx reduction in the second SCR 55 during regeneration.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling an internal combustion engine fluidly coupled to an exhaust aftertreatment system, wherein the exhaust aftertreatment system includes a particulate filter device, a first selective catalytic reduction device disposed upstream relative to a second selective catalytic reduction device, and an injection system disposed to inject a reductant into the exhaust gas feedstream upstream relative to the first selective catalytic reduction device, the method comprising:
monitoring engine operation;
determining an amount of particulate matter stored on the particulate filter based upon the engine operation;
determining an amount of reductant stored on the second selective catalytic reduction device;
determining operating conditions associated with the exhaust aftertreatment system;
executing, via a controller, a process to regenerate the particulate filter only when the amount of reductant stored on the second selective catalytic reduction device is greater than a minimum threshold and the operating conditions are conducive to regenerating of the particulate filter; and
controlling, via the controller, the injection system to inject reductant into the exhaust gas feedstream to control the amount of reductant stored on the second selective catalytic reduction device, including:
determining an effective reductant storage for the first and second selective catalytic reduction devices,
determining a total effective reductant storage setpoint for the first and second selective catalytic reduction devices, and
controlling the injection system to inject reductant into the exhaust gas feedstream based upon the effective reductant storage for the first and second selective catalytic reduction devices and the total effective reductant storage setpoint for the first and second selective catalytic reduction devices.

2. The method of claim 1, wherein determining an effective reductant storage for the first and second selective catalytic reduction devices comprises:
determining parameters associated with a reductant dosing rate, an exhaust flowrate and an air/fuel ratio;
determining an amount of reductant stored on the first selective catalytic reduction device based upon the parameters;
determining an amount of reductant stored on the second selective catalytic reduction device based upon the amount of reductant stored on the first selective catalytic reduction device and the parameters; and
determining the effective reductant storage for the first and second selective catalytic reduction devices based upon the amount of reductant stored on the first selective catalytic reduction device and the amount of reductant stored on the second selective catalytic reduction device.

3. The method of claim 1, wherein determining a total effective reductant storage setpoint for the first and second selective catalytic reduction devices comprises:
determining parameters associated with exhaust gas temperature and space velocities for the first and second selective catalytic reduction devices;
determining a first reductant storage setpoint for the first selective catalytic reduction device based upon the parameters associated with exhaust gas temperature and the space velocity for the first selective catalytic reduction device;
determining a second reductant storage setpoint for the second selective catalytic reduction device based upon the parameters associated with exhaust gas temperature and the space velocities for the first and second selective catalytic reduction devices when not preparing to execute the process to regenerate the particulate filter;
determining a third reductant storage setpoint for the second selective catalytic reduction device based upon the parameters associated with exhaust gas temperature and the space velocities for the first and second selective catalytic reduction devices prior to executing the process to regenerate the particulate filter; and
determining the total effective reductant storage setpoint for the first and second selective catalytic reduction devices based upon the first and third reductant setpoints prior to executing the process to regenerate the particulate filter.

4. The method of claim 1, wherein the reductant comprises urea.

5. A method for controlling a compression-ignition internal combustion engine fluidly coupled to an exhaust aftertreatment system, wherein the exhaust aftertreatment system includes a particulate filter device, a first selective catalytic reduction device disposed upstream relative to a second selective catalytic reduction device, and an injection system disposed to inject urea into the exhaust gas feedstream upstream relative to the first selective catalytic reduction device, the method comprising:
monitoring engine operation;
determining an amount of particulate matter stored on the particulate filter based upon the engine operation;
determining an amount of ammonia stored on the second selective catalytic reduction device;
determining operating conditions associated with the exhaust aftertreatment system;
executing, via a controller, a process to regenerate the particulate filter only when the amount of ammonia stored on the second selective catalytic reduction device is greater than a minimum threshold and the operating conditions are conducive to regenerating of the particulate filter; and
controlling, via the controller, the injection system to inject urea into the exhaust gas feedstream to control the amount of ammonia stored on the second selective catalytic reduction device, including
determining an effective ammonia storage for the first and second selective catalytic reduction devices,
determining a total effective ammonia storage setpoint for the first and second selective catalytic reduction devices, and
controlling the injection system to inject urea into the exhaust gas feedstream based upon the effective ammonia storage for the first and second selective catalytic reduction devices and the total effective ammonia storage setpoint for the first and second selective catalytic reduction devices.

6. The method of claim 5, wherein determining an effective ammonia storage for the first and second selective catalytic reduction devices comprises:
determining parameters associated with a urea dosing rate, an exhaust flowrate and an air/fuel ratio;
determining an amount of ammonia stored on the first selective catalytic reduction device based upon the parameters;
determining an amount of ammonia stored on the second selective catalytic reduction device based upon the amount of ammonia stored on the first selective catalytic reduction device and the parameters; and
determining the effective ammonia storage for the first and second selective catalytic reduction devices based upon the amount of ammonia stored on the first selective catalytic reduction device and the amount of ammonia stored on the second selective catalytic reduction device.

7. The method of claim 5, wherein determining a total effective ammonia storage setpoint for the first and second selective catalytic reduction devices comprises:
determining parameters associated with exhaust gas temperature and space velocities for the first and second selective catalytic reduction devices;
determining a first ammonia storage setpoint for the first selective catalytic reduction device based upon the parameters associated with exhaust gas temperature and the space velocity for the first selective catalytic reduction device;
determining a third ammonia storage setpoint for the second selective catalytic reduction device based upon the parameters associated with exhaust gas temperature and the space velocities for the first and second selective catalytic reduction devices prior to executing the process to regenerate the particulate filter; and
determining the total effective ammonia storage setpoint for the first and second selective catalytic reduction devices based upon the first and third ammonia setpoints prior to executing the process to regenerate the particulate filter.

8. An exhaust aftertreatment system for an internal combustion engine, comprising:
a particulate filter and a first selective catalytic reduction device disposed upstream relative to a second selective catalytic reduction device,
an injection system disposed to inject a reductant into the exhaust gas feedstream upstream relative to the first selective catalytic reduction device,
a controller disposed to monitor the exhaust aftertreatment system, the exhaust gas feedstream and the internal combustion engine, and disposed to control the injection system;
the controller including an instruction set that is executable to:
monitor operation of the engine,
determine an amount of particulate matter stored on the particulate filter based upon the operation of the engine,
determine an amount of reductant stored on the second selective catalytic reduction device,
determine operating conditions associated with the internal combustion engine and the exhaust aftertreatment system,
regenerate the particulate filter only when the amount of reductant stored on the second selective catalytic reduction device is greater than a minimum threshold and the operating conditions associated with the internal combustion engine and the exhaust aftertreatment system are conducive to regenerating of the particulate filter, and
control the injection system to inject reductant into the exhaust gas feedstream to control the amount of reductant stored on the second selective catalytic reduction device, which includes an instruction set executable to:
determine an effective reductant storage for the first and second selective catalytic reduction devices,
determine a total effective reductant storage setpoint for the first and second selective catalytic reduction devices, and
control the injection system to inject reductant into the exhaust gas feedstream based upon the effective reductant storage for the first and second selective catalytic reduction devices and the total effective reductant storage setpoint for the first and second selective catalytic reduction devices.

9. The device of claim 8, wherein the internal combustion engine is a compression-ignition internal combustion engine.

10. The device of claim 8, wherein the particulate filter and the first selective catalytic reduction device are disposed on a common substrate.

11. The device of claim 8, wherein the internal combustion engine is disposed on a vehicle, and wherein the second selective catalytic reduction device is disposed in an under-floor location on the vehicle.

* * * * *